219-121 SR
3/10/87 OR 4,649,257

United States Patent [19]
Yakovlevitch et al.

[11] Patent Number: 4,649,257
[45] Date of Patent: Mar. 10, 1987

[54] GAS DISTRIBUTION RING FOR PLASMA GUN

[75] Inventors: Daniel Yakovlevitch, Bayside; Anthony J. Rotolico, Hauppauge, both of N.Y.

[73] Assignee: The Perkin-Elmer Corporation, Norwalk, Conn.

[21] Appl. No.: 860,286

[22] Filed: May 6, 1986

[51] Int. Cl.[4] .................... B23K 9/00
[52] U.S. Cl. .................... 219/121 PP; 219/121 PM; 219/121 PQ; 219/75; 313/231.51
[58] Field of Search .................... 219/74, 75, 76.16, 121 P, 219/121 PM, 121 PP, 121 PQ, 121 PR, 121 PL; 313/231.21, 231.31, 231.41

[56] References Cited

U.S. PATENT DOCUMENTS

| | | | |
|---|---|---|---|
| 2,941,063 | 6/1960 | Ducati et al. | 219/121 PM |
| 3,145,287 | 8/1964 | Siebein et al. | 219/121 PP |
| 3,286,997 | 11/1966 | Ledbetter | 219/121 P |
| 3,313,908 | 4/1967 | Unger et al. | 219/121 P |
| 3,823,302 | 7/1974 | Muehlberger | 219/121 PL |
| 3,851,140 | 11/1974 | Coucher | 219/121 PR |
| 3,869,593 | 3/1975 | New et al. | 219/121 PR |

*Primary Examiner*—M. H. Paschall
*Attorney, Agent, or Firm*—H. S. Ingham; F. L. Masselle; E. T. Grimes

[57] ABSTRACT

A gas distribution ring for a plasma gun comprises a ring member with two sets of gas inlet orifices extending from the outer surface inwardly through the ring member. The outer surface has an undulated groove for an O-ring formed therein, and the orifices are positioned with respect to the undulated O-ring such that one set of orifices are isolated on one side of the O-ring and the other set of orifices are isolated on the other side of the O-ring. In a preferred embodiment the orifices of one set are radial with respect to the axis of the ring, and the orifices on the other side of the undulated O-ring have a tangential component to provide vortical gas flow in the arc region of the gun. The gas distribution ring positioned in the plasma spray gun permits a simple choice between radial and vortical flow in the arc region of the gun, without alteration of the gun.

17 Claims, 5 Drawing Figures

GAS DISTRIBUTION RING FOR PLASMA GUN

This invention relates to a plasma gun and particularly to a gas distribution ring therefor that provides for selection of radial or vortical gas flow in the arc region of the plasma gun.

BACKGROUND OF THE INVENTION

Plasma guns are utilized for such purposes as thermal spraying which involves the heat softening of a heat fusible material, such as a metal or ceramic, and propelling the softened material in particulate form against a surface to be coated. The heated particles strike the surface and bond thereto. The heat fusible material is typically supplied to the plasma spray gun in the form of powder that is generally below 100 mesh U.S. standard screen size to about 5 microns.

In typical plasma systems an electric arc is created between a water cooled nozzle (anode) and a centrally located cathode. An inert gas passes through the electric arc and is exited thereby to temperatures of up to 15,000 degrees Centigrade. The plasma of at least partially ionized gas issuing from the nozzle resembles an open oxy-acetylene flame. A typical plasma flame spray gun is described in U.S. Pat. No. 3,145,287.

Plasma guns generally are capable of operating on either argon or nitrogen as the primary plasma gas. For argon the gas is introduced into the chamber near the cathode through one or more orifices with a tangential component to cause a vortical flow to the plasma as shown and described, for example, in U.S. Pat. No. 3,823,302. The reason is, that without the vortex, the arc is not carried far enough down the nozzle, resulting in low voltage and low efficiency. On the other hand, radially directed gas input may be used, as shown in aforementioned U.S. Pat. No. 3,145,287. Radial input is generally selected for nitrogen because a vortex tends to extend the nitrogen arc a long distance down the bore of the nozzle causing difficulty in starting the arc.

However, without a vortex for nitrogen the voltage and efficiency are low. Therefore, a secondary gas such as hydrogen is added, having the effect of improving these factors. When argon is used, even with a vortex the efficiency is undesirably low. Hydrogen is again added where possible, but that gas is often considered undesirable as it may cause brittleness in the sprayed coating. Helium is an alternative secondary gas but is expensive and less effective.

Generally each plasma spray gun is set up for a particular type of plasma forming gas, either with radial or tangential inlet. Guns that may be used for either primary gas typically have different gas distribution rings inserted near the cathode, requiring disassembly to change gases. Several efforts have been made to simplify the change. U.S. Pat. No. 3,313,908 discloses a plasma torch with two types of gas inlet ports for different gases that are selected alternatively by means of either of two external gas conduit fittings. This method still requires changing fittings on the gun.

U.S. Pat. No. 3,851,140 shows a plasma spray gun with a gas distribution ring having primary openings slanted forwardly and secondary openings oriented tangentially. The two sets of inlet openings function concomitantly to provide a helical flow component circumscribing the linear component. This ring is said to controllingly alter the gas flow, but there is no means to alter the flow for different gases without changing rings, nor is there means to change the type of flow during operation.

In U.S. Pat. No. 2,941,063 there is depicted a plasma torch in which gas is introduced at two separate locations. Near the cathode a radial source inlet introduces gas through an orifice into a chamber proximate the cathode to provide gas flow for the initial portion of the arc and associated plasma. A tangential gas source is directed into a second annular chamber of large diameter that is well downstream of the radial inlet chamber. These widely separated gas inlet sources are directed to different portions of the arc and do not provide for gas inlet choice or control in the proximity of the cathode.

In view of the foregoing an object of the present invention is to provide a novel gas distribution ring for use in a plasma gun, which permits a simple selection of either radial or vortical gas flow in the arc region of the gun.

Another object is to provide a novel gas distribution ring for use in a plasma gun, which permits separate radial and tangential gas inlets and contemporaneous regulation thereof.

Yet another object is to provide a novel gas distribution ring incorporating a means for isolating gas inlet ducts having different inlet flow characteristics.

A further object is to provide an improved plasma gun containing a gas distribution ring that allows selection between radial and tangential gas inlet without alteration of the gun.

These and still further objects will become apparent from the following description read in conjunction with the drawings.

BRIEF DESCRIPTION OF THE INVENTION

The foregoing objects are achieved with a gas distribution ring for a plasma gun, which comprises a ring member with a cylindrical outer surface and with one or more first gas inlet orifices and one or more second gas inlet orifices therein. The first and second orifices extend from the outer surface inwardly through the ring member proximate to a plane that is oriented perpendicularly to the axis of the ring member. The outer surface has an undulated O-ring groove formed therein. The first and second orifices are positioned at the outer surface cooperatively with respect to the undulated O-ring groove such that the first orifices are isolated on one side of the undulated O-ring groove and the second orifices are isolated on the other side of the undulated O-ring groove.

DETAILED DESCRIPTION OF THE INVENTION

Figure 1:
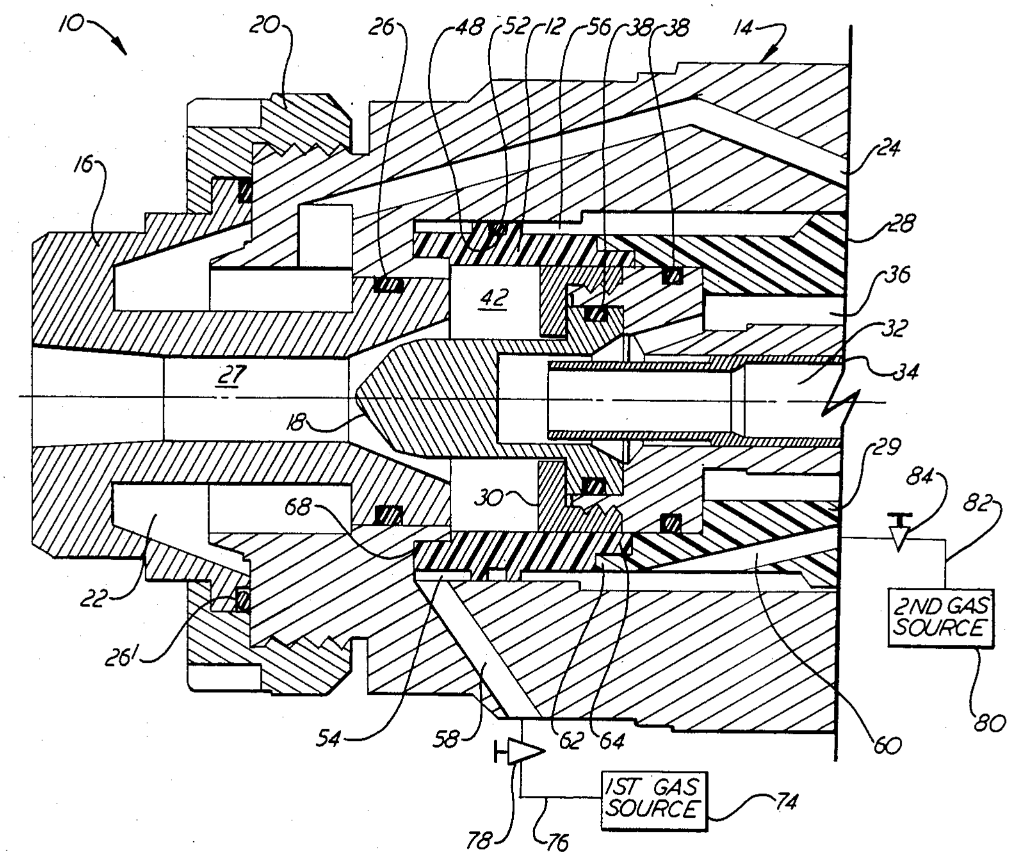
FIG. 1 is a partial longitudinal sectional view of a plasma gun incorporating the present invention.

FIG. 1 illustrates the front end 10 of a typical plasma gun (such as a Type 9MB Gun sold by the Metco Division of The Perkin-Elmer Corporation) incorporating a gas distribution ring 12 of the present invention. A gun body 14 generally retains a hollow cylindrical copper anode nozzle member 16 and a cylindrical tungsten cathode member 18 coaxially with respect to each other, the nozzle and cathode being in spaced relationship operable to maintain a plasma-generating arc therebetween. The gun body encloses cathode 18 and anode nozzle 16, provides channeling for the fluids and provides electrical contacts. Nozzle 16 is held in gun body 14 with a retainer ring 20. An annular cooling region 22 for the nozzle is fed coolant, typically water, through a nozzle coolant channel 24; a similar channel (not shown) conducts the coolant away. O-ring seals 26 and 26' between nozzle 16 and gun body 14 retain the coolant. In operation a voltage applied between cathode member 18 and nozzle member 16 supports an arc which a gas flow causes to extend down the nozzle bore 27 and generates a plasma "flame" that issues from the bore at high temperature and velocity.

In the example of FIG. 1 cathode 18 is held on a cathode holder 29 with a retaining nut 30, the cathode holder fitting axially in a cathode insulator tube 28 which in turn fits axially in gun body 14. The cathode insulator tube of this example is formed of rigid plastic which provides electrical insulation between cathode 18 and anode nozzle 16. Coolant is supplied to the cathode through an inner channel 32 of tube 34 and circulates back through an annular channel and a duct 36 outside the tube. Inner O-ring seals 38 retain the coolant for the cathode.

Gas distribution ring 12 is fitted coaxially in gun body 14 within an annular gas inlet chamber 42 that is proximate to the cathode and generally acts as a plenum. Gas distribution ring 12, is of suitable length and configuration to fit snugly in the gun body at the outer perimeter of inlet chamber 42. In the example of FIG. 1 the gas distribution ring has a shoulder 62 near the rear portion thereof associated with a small protrusion 64 configured to engage a similar protrusion in cathode insulator tube 28, thus retaining the ring on the cathode holder as indicated in the Figure. However, it will be appreciated that such retainment may not be necessary or that other known or desired retaining means may be used in different model guns.

Figure 2:
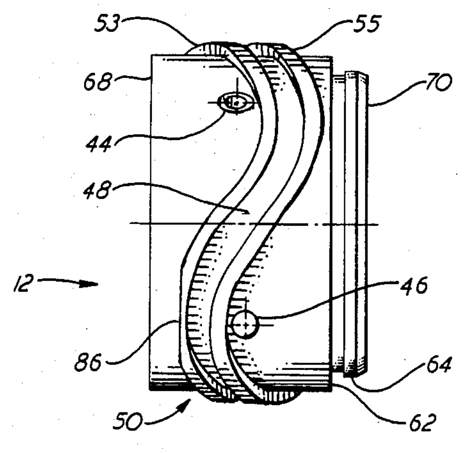
FIG. 2 is a longitudinal view of a gas distribution ring of the present invention incorporated in FIG. 1.
Figure 3:
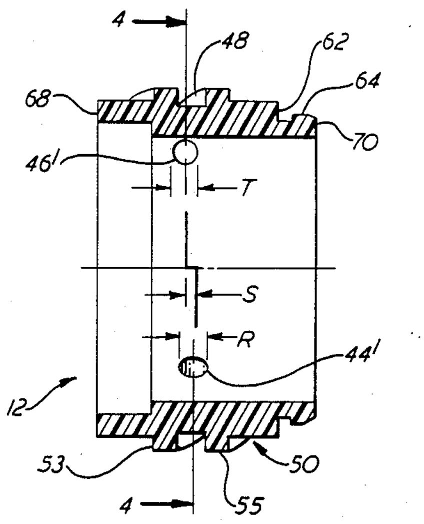
FIG. 3 is a longitudinal sectional view of the gas distribution ring of FIG. 2.
Figure 4:
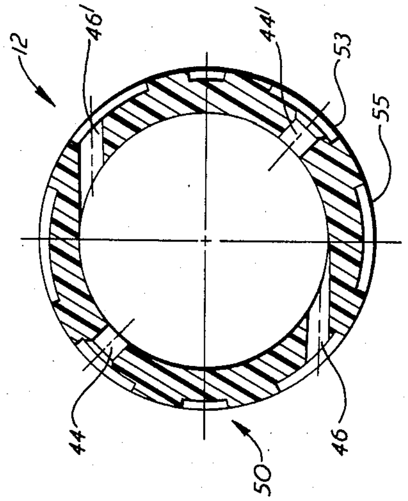
FIG. 4 is a transverse sectional view taken along section line 4—4 of FIG. 3.

One embodiment of a gas distribution ring according to the present invention is shown in FIG. 2. The gas distribution ring is shown in axial section in FIG. 3 and cross section in FIG. 4. FIG. 3 is the same section of the ring taken on its axis as is shown in FIG. 1, with further details. FIG. 4, a cross section taken in a plane normal to the axis of the ring, shows an embodiment of the ring of the present invention wherein there are two gas inlet orifices 44, 44' that pass radially inwardly through the ring, and two other gas inlet orifices 46, 46' that pass inwardly through the ring with a tangential component. As described in detail below, each of the orifices 44, 44', 46, 46' is proximate to a hypothetical plane that is perpendicular to the axis of the ring.

In operation of the gun the radial flow becomes linear as it passes adjacent cathode member 18 and through nozzle bore 27. Similarly, the tangential inlet provides a vortical flow that develops a linear component while passing through and out of the gun. If both radial and tangential inlets are used simultaneously, the flows generally mix and combine in the plenum region 42.

Figure 5:
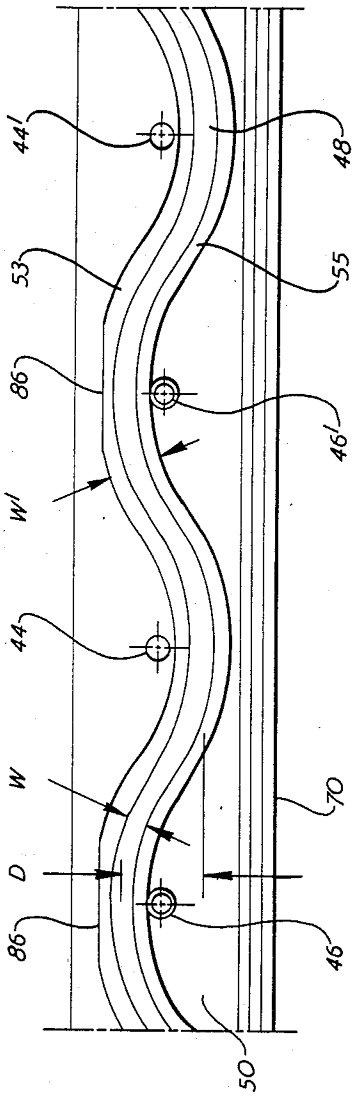
FIG. 5 is a developed view of the outer circumference of the gas distribution ring of FIG. 2.

An O-ring groove 48 in the outer surface 50 of gas distribution ring 12 circumscribes the ring. As shown in FIG. 5, which is a developed view of the outer surface, this groove 48 is undulated in a generally sinusoidal curve in the surface such that an O-ring 52 inserted in the groove (FIG. 1) isolate radial orifices 44, 44' on one side of the O-ring and tangential orifices 46, 46' on the other side. To achieve this in a simple manner the two radial orifices 44, 44' and the two tangential orifices 46, 46' are equally spaced arcuately in alternate respective positions at outer surface 50 (FIG. 4).

Any reasonable numbers of orifices 44, 44', 46, 46' other than two of each type may be incorporated. In some circumstances it may be desirable to have unequal numbers of radial and tangential orifices, in which case one or more positions in the undulations may be void of an orifice. Two of each provides a well distributed flow while being a practical number for isolation by the undulated O-ring.

In a preferable embodiment, incorporated in FIGS. 2–5, a pair of undulated rims 53,55 are formed on outer surface 50. These rims are juxtaposed cooperatively to form undulated O-ring groove 48 therebetween. The rims also provide for a forward gas annulus 54 and a rear gas annulus 56 (FIG. 1). These annuli respectively communicate with the orifices 44, 44', 46, 46' in distribution ring 12 on either side of O-ring 52 and act as gas manifolds for the orifices. (As used herein, the term "forward" and terms derived therefrom or synonymous or analogous thereto, have reference to the end from which the plasma flame issues from the gun; similarly "rearward" etc. denote the opposite location.) Thus first rim 53 provides a rear boundary for forward gas annulus 54, and second rim 55 provides a forward boundary for rear gas annulus 56.

Plasma forming gas such as nitrogen is provided by a first source of regulated gas (schematically shown at 74 in FIG. 1) fed through a first gas line 76 and a first gas valve 78 into a forward gas channel 58 in the gun body 14 which leads to forward gas annulus 54. Similarly a second source of regulated plasma forming gas 80, either of the same type as the first or another such as argon, is introduced through a second gas line 82 and a second gas valve 84 through a rear gas channel 60 into rear gas annulus 56.

As previously indicated, distribution ring 12 is held in gun body 14 in the present example by shoulder 62 and protrusion 64. Forward surface 68 of the gas distribution ring fits snugly against a corresponding surface of gun body 14, and shoulder 62 of the distribution ring presses against cathode holder 28. Forward surface 68 and the rear surface of shoulder 62 provide satisfactory gas seals but, alternatively, may incorporate O-rings (not shown). As depicted in FIG. 3 and FIG. 5 flat spots 86 on rim 53 help provide for sufficient size of gas annulus 54 and prevents blocking of gas channel 58. The distribution ring may be formed of a high temperature plastic such as Delrin TM, or may be ceramic such as machinable alumina.

In the evolution of practical commercial plasma spray guns, gas inlet chamber 42 near cathode 18 has become relatively small. With little area to introduce gas, the ring 12 of the present invention is especially useful because orifices 44, 44', 46, 46' necessarily lie close to or within a plane that is perpendicular to the axis of the ring and gun. Put another way, the configuration of the orifices should be such that, at the outer surface, radial orifices 44, 44' have axes lying substantially in or intersecting one plane that is perpendicular to the axis of the ring, and tangential orifices 46, 46' have axes lying substantially in or intersecting another plane that is parallel and proximate to the first plane. As a guideline the two planes should be separated by a distance S (FIG. 3) less than the sum (R+T) of the average diameter R of the radial ducts and the average diameter T of the tangential ducts. However, as shown in FIG. 3, a very small separation S of the planes is quite practical with the undulated O-ring of the present invention. The close separation is especially desirable for homogeneous flow when both sets of inlets are used simultaneously as described below.

Since the orifices 44, 44', 46, 46' are all close to the same plane, it is generally immaterial whether the radial orifices 44, 44' are positioned forward or rearward of the undulated O-ring. However, where the planes have significant separation one skilled in the art may readily test both ways to establish the better position, if any, for arc stability, voltage or other factors. For illustration, the figures show radial orifices 44, 44' in the forward position and tangential orifices 46, 46' rearward.

The undulations of O-ring groove 48 must be large enough to accommodate orifices 44, 44', 46, 46' lying close to the same plane as indicated in FIG. 5. The distance D between adjacent crests and troughs of the center line of the groove preferably is greater than the width W of the groove, and most preferably is greater than the width W' across opposite sides of undulated rims 53,55.

The separately controlled gas sources leading to the separated sets of orifices allows for choice of either radial input to provide linear gas flow in the gun, or tangential gas input to the annular gas input chamber in the vicinity of the cathode to provide vortical flow, without changing parts or attachments of the gun. Thus the gun may be operated on either argon plasma gas (tangential inlet) or nitrogen gas (radial inlet) merely by selection of the appropriate gas source 74 or 80 with one of the gas valves 78, 84 turned on and the other off.

In another application of the gas distribution ring of present invention the same type of gas is separately regulated into each of the two sets of orifices, allowing for precision adjustment of the vortex flow in the gun in the manner disclosed in copending application Ser. No. 860,165 filed 5-6-86 concurrently herewith and incorporated herein by reference. In particular nitrogen may be utilized in the vortex mode. By careful choice of the proportion of tangential to radial flow the vortex can be adjusted for optimum arc length and voltage, sufficient for good efficiency without the vortex carrying the arc out of the nozzle. The plasma arc can be initiated with the nitrogen flowing through the radial orifices in the distribution ring, and then tangential flow brought in to increase the voltage.

Other configurations for the orifices 44, 44', 46, 46' may be chosen within the present invention. For example, the orifices described above as radial may also have a component directing gas axially such as in a forward direction. Alternatively the radial orifices may have some tangential component that is less than that of the second set of orifices; or one set may have both forward and tangential components. It also may be desirable to provide that one or more individual orifices within a set have different orientations from one or more others in a set. As an example one orifice forward of undulated O-ring 52 may be purely radial and the other may have an axial or tangential component. Further within the spirit of the present invention, one set of orifices may be substantially radial and the other set forwardly slanted without tangential component. Thus, broadly, the gas distribution ring with undulated O-ring provides for two separated sets of gas orifices for two separately controlled gas inlets.

The maximum number of orifices is limited only by the practicalities of forming the undulated O-ring in its groove. Although the term O-ring ordinarily refers to the normal rubber-like sealing member of circular cross section, it is to be understood that the term as used herein is intended to include any other cross section for such a ring seal that may be desirable such as oval, rectangular or L-shaped. Any known or desired O-ring material such as rubber, silicone, soft plastic or the like may be used, depending on such factors as operating temperature.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. A gas distribution ring for use in a plasma gun, comprising a ring member with an axis and a cylindrical outer surface and having therein one or more first gas inlet orifices and one or more second gas inlet orifices, the first and second orifices extending from the outer surface inwardly through the ring member proximate to a plane that is oriented perpendicularly to the axis of the ring member, the outer surface having an undulated O-ring groove formed therein, the first and second orifices being positioned at the outer surface cooperatively with respect to the undulated O-ring groove such that the first orifices are isolated on one side of the undulated O-ring groove and the second orifices are isolated on the other side of the undulated O-ring groove.

2. The gas distribution ring of claim 1 wherein each orifice has a central axis, and at the outer surface of the ring member, the axes of the first orifices contact a first plane that is oriented perpendicularly to the axis of the ring member, and the axes of the second orifices contact a second plane that is parallel and proximate to the first plane.

3. The gas distribution ring of claim 1 wherein at least one of the second orifices has a tangential component to provide vortical gas flow in the plasma spray gun.

4. The gas distribution ring of claim 3 wherein each of the first orifices is substantially radial with respect to the axis of the ring member.

5. The gas distribution ring of claim 1 wherein the ring member has two first orifices and two second orifices equally spaced arcuately at the outer surface of the ring member, the first and second orifices being in alternate respective positions.

6. The gas distribution ring of claim 2 wherein the O-ring groove undulations are such that the distance D between adjacent crests and troughs of the center line of the O-ring groove is greater than the width W of O-ring groove.

7. The gas distribution ring of claim 1 wherein the outer surface of the ring member includes a first undulated rim and a second undulated rim cooperatively juxtaposed with the first undulated rim to form the undulated O-ring groove therebetween, the first and second orifices being positioned at the outer surface with respect to the first and second undulated rims such that the first orifices are isolated on one side of the first and second undulated rims and the second orifices are isolated on the other side of the first and second undulated rims.

8. A gas distribution ring for use in a plasma gun, comprising a ring member with an axis a circumferential outer surface, the ring member having two first inlet orifices therein extending radially inwardly from the outer surface through the ring member, the first orifices contacting at the outer surface a first plane that is oriented perpendicularly to the axis of the ring member, and two second inlet orifices therein extending inwardly with a tangential component from the outer surface through the ring member and contacting at the outer surface a second plane that is parallel and proximate to the first plane, the two first orifices and the two second orifices being equally spaced arcuately at the outer surface in alternate respective positions, the outer surface including a first undulated rim and a second undulated rim cooperatively juxtaposed with the first undulated rim to form the O-ring groove therebetween, the first and second orifices being positioned at the outer surface cooperatively with respect to the first and second undulated rims such that the first orifices are isolated on one side of the first and second undulated rims and the second orifices are isolated on the other side of the first and second undulated rims.

9. A plasma gun comprising a cylindrical cathode member, a hollow cylindrical anode nozzle member, a gun body retaining the cathode member and nozzle member coaxially in spaced relationship operative to maintain a plasma-generating arc therebetween, a gas distribution ring and an undulated O-ring, the gun body having an annular gas inlet chamber therein encompassing the cathode member, the gas distribution ring being situated in the inlet chamber and comprising a ring member with an axis and a cylindrical outer surface and having therein one or more first gas inlet orifices and one or more second gas inlet orifices, the first and second orifices extending from the outer surface inwardly through the ring member proximate to a plane that is oriented perpendicularly to the axis of the ring member, the outer surface having an undulated O-ring groove formed therein containing the undulated O-ring in sealing contact with the gun body, the first and second orifices being positioned at the outer surface cooperatively with respect to the undulated O-ring such that the first orifices are isolated on one side of the undulated O-ring and the second orifices are isolated on the other side of the undulated O-ring.

10. The plasma gun of claim 9 wherein each orifice has a central axis, and at the outer surface of the ring member, the axes of the first orifices contact a first plane that is oriented perpendicularly to the axis of the ring member, and the axes of the second orifices contact a second plane that is parallel and proximate to the first plane.

11. The plasma gun of claim 9 wherein at least one of the second orifices has a tangential component to provide vortical gas flow in the plasma spray gun.

12. The plasma gun of claim 9 wherein at least one of the first orifices has a directional component parallel to the axis of the ring member.

13. The plasma gun of claim 11 wherein each of the first orifices is substantially radial with respect to the axis of the ring member.

14. The plasma gun of claim 9 wherein the ring member has two first orifices and two second orifices equally spaced circumferentially at the outer surface of the ring member, the first and second orifices being in alternate respective positions.

15. The gas distribution ring of claim 10 wherein the O-ring groove undulations are such that the distance D between adjacent crests and troughs of the center line of the O-ring groove is greater than the width W of O-ring groove.

16. The plasma gun of claim 9 wherein the gun body is cooperative with the outer surface of the ring member to form a forward gas annulus communicating with the first orifices and a rear gas annulus communicating with the second orifices, the undulated O-ring providing a seal between the forward gas annulus and the rear gas annulus.

17. The plasma gun of claim 16 wherein the outer surface of the ring member includes a first undulated rim and a second undulated rim cooperatively juxtaposed with the first undulated rim to form the undulated O-ring groove therebetween, the first and second orifices being positioned at the outer surface with respect to the first and second undulated rims such that the first orifices are isolated on one side of the first and second undulated rims and the second orifices are isolated on the other side of the first and second undulated rims.

* * * * *